United States Patent
Deo et al.

(10) Patent No.: US 10,990,901 B2
(45) Date of Patent: Apr. 27, 2021

(54) TRAINING, VALIDATING, AND MONITORING ARTIFICIAL INTELLIGENCE AND MACHINE LEARNING MODELS

(71) Applicant: Accenture Global Solutions Limited, Dublin (IE)

(72) Inventors: Arati Deo, Bangalore (IN); Mallika Fernandes, Bangalore (IN); Kishore P. Durg, Bangalore (IN); Teresa Escrig, Olympia, WA (US); Bhaskar Ghosh, Bangalore (IN); Mahesh Venkataraman, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 16/119,536

(22) Filed: Aug. 31, 2018

(65) Prior Publication Data
US 2019/0147371 A1    May 16, 2019

(30) Foreign Application Priority Data
Nov. 13, 2017 (IN) .............................. 201741040434

(51) Int. Cl.
*G06N 20/00* (2019.01)
*G06N 3/08* (2006.01)

(52) U.S. Cl.
CPC .............. *G06N 20/00* (2019.01); *G06N 3/08* (2013.01)

(58) Field of Classification Search
CPC ................................................... G06N 20/00
See application file for complete search history.

(56) References Cited

U.S. PATENT DOCUMENTS

| | | | |
|---|---|---|---|
| 2017/0048109 A1* | 2/2017 | Kant | H04L 41/5025 |
| 2017/0186009 A1* | 6/2017 | Zolli | G06Q 20/4016 |
| 2017/0193392 A1 | 7/2017 | Liu et al. | |
| 2017/0243140 A1 | 8/2017 | Achin et al. | |

OTHER PUBLICATIONS

Katharine Schwab, "Google's Rules for Designers Working With AI", https://www.fastcompany.com/90132700/googles-rules-for-designing-ai-that-isnt-evil, Jul. 11, 2017, 8 pages.
Extended European Search Report for Application No. EP18205292.8, dated Mar. 28, 2019, 80 pages.

* cited by examiner

*Primary Examiner* — Vincent Gonzales
(74) *Attorney, Agent, or Firm* — Harrity & Harrity, LLP

(57) ABSTRACT

A device identifies training data and scoring data for a model, and removes bias from the training data to generate unbiased training data. The device trains the model with the unbiased training data to generate trained models, and processes the trained models, with the scoring data, to generate scores for the trained models. The device selects a trained model, from the trained models, based on model metrics and the scores, and processes a training sample, with the trained model, to generate first results, wherein the training sample is created based on the unbiased training data and production data. The device processes a production sample, with the trained model, to generate second results, wherein the production sample is created based on the production data and the training sample. The device provides the trained model for use in a production environment based on the first results and the second results.

20 Claims, 13 Drawing Sheets

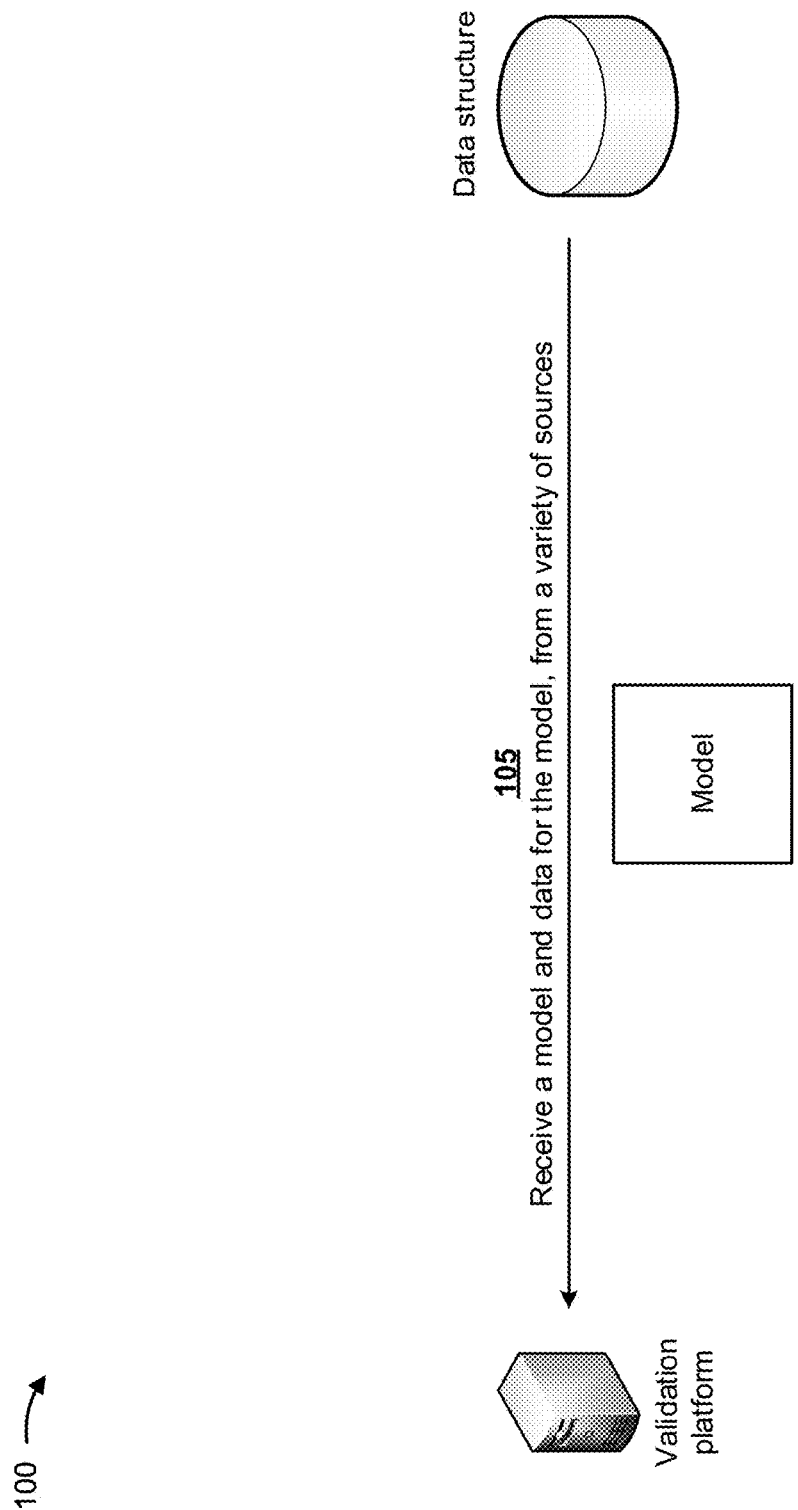

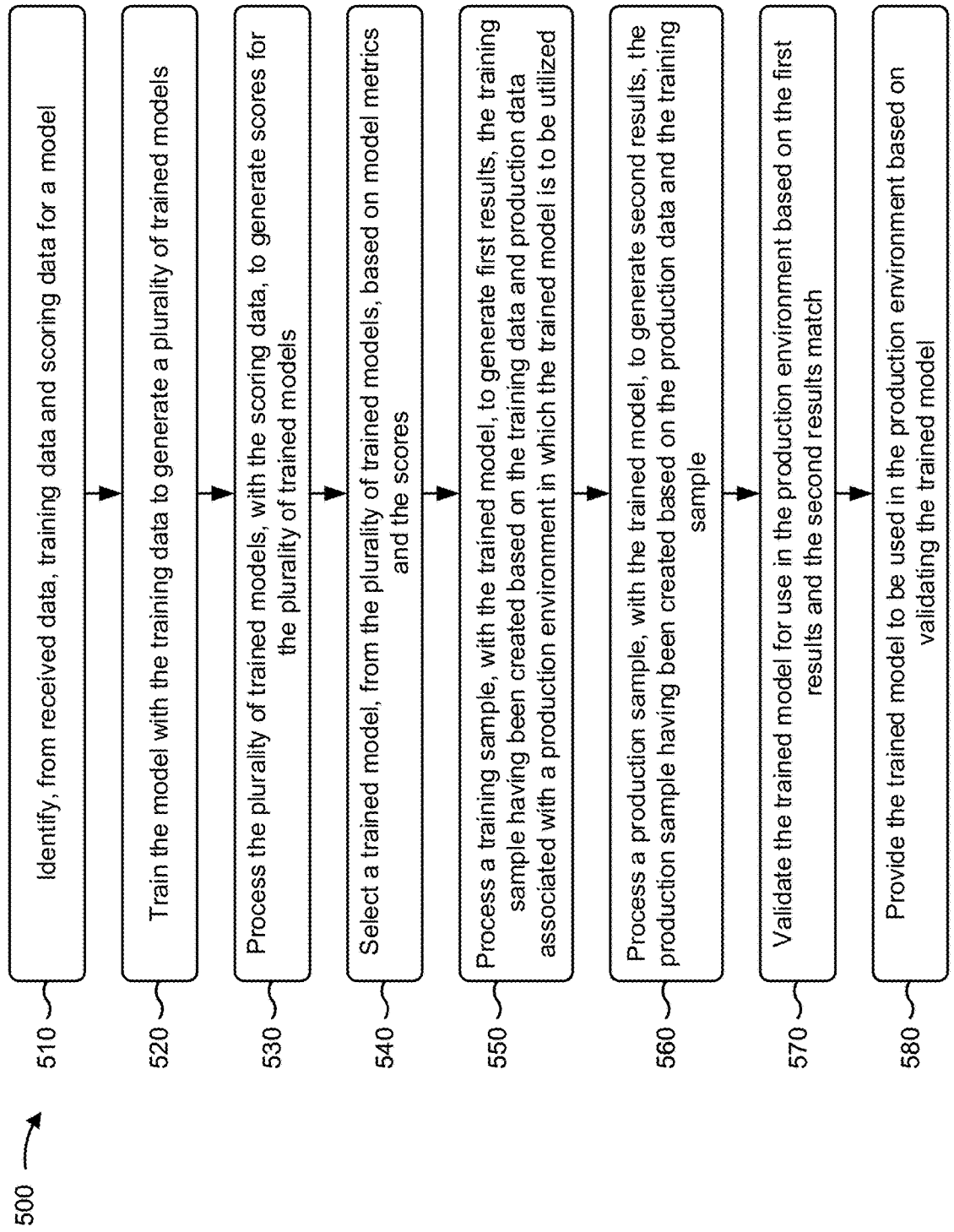

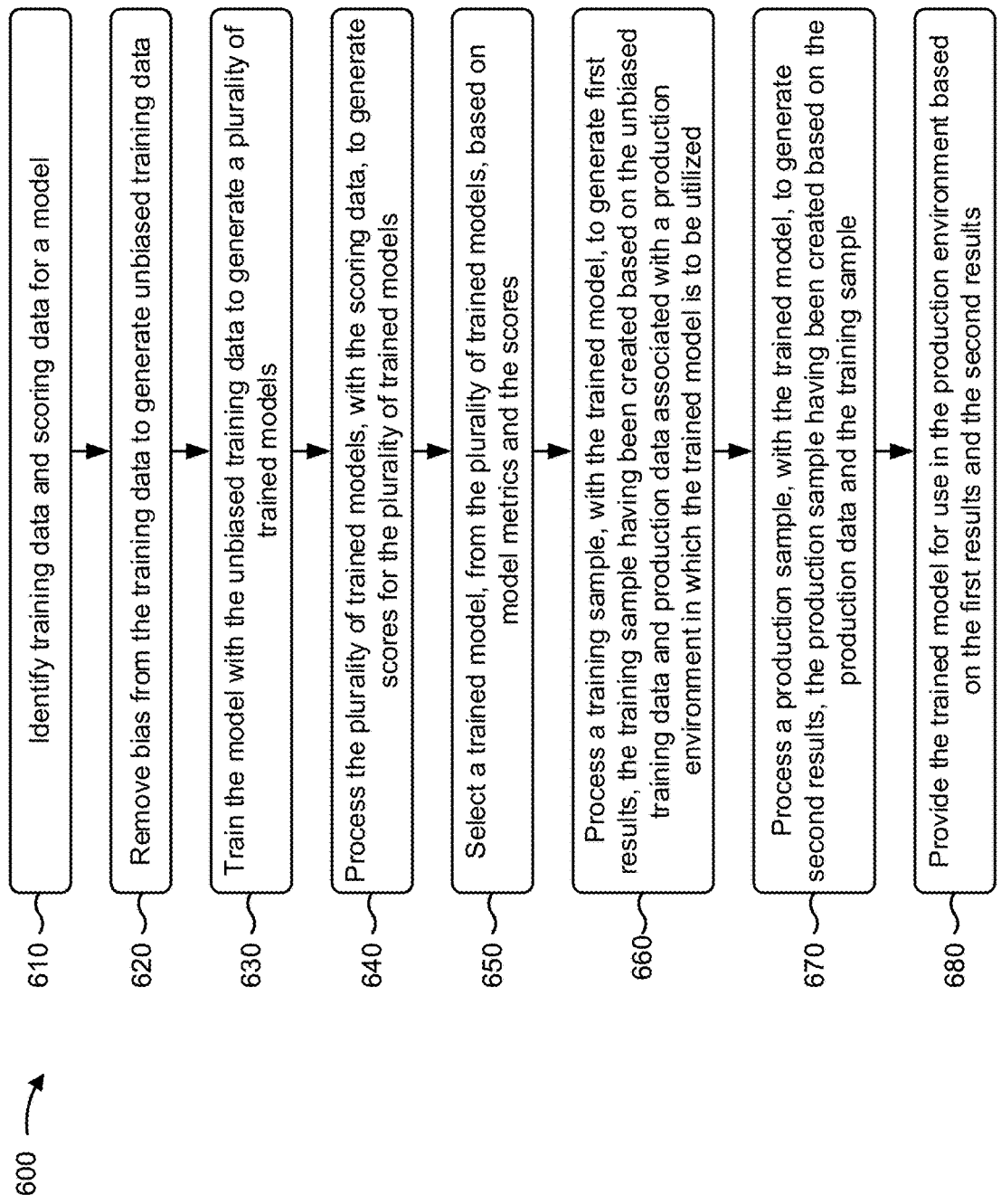

TRAINING, VALIDATING, AND MONITORING ARTIFICIAL INTELLIGENCE AND MACHINE LEARNING MODELS

RELATED APPLICATION

This application claims priority under 35 U.S.C. § 119 to Indian Patent Application No. 201741040434, filed on Nov. 13, 2017, the content of which is incorporated by reference herein in its entirety.

BACKGROUND

Artificial intelligence (AI) describes different technologies which enable a machine to emulate humans in sensing and understanding the environment and in making decisions or predictions. Through advanced, human-like intelligence (e.g., provided by software and hardware) an artificial intelligence device can mimic human behavior or perform tasks as if the device were human. Artificial intelligence encompasses a multitude of evolving technologies which enhance abilities of machines to sense (e.g., via computer vision, audio processing, sensor processing, and/or the like), comprehend collected information (e.g., via natural language processing, knowledge representation, and/or the like), act or make informed decisions (e.g., via inference engines, predictions, expert systems, and/or the like), while learning and self-tuning (e.g., via machine learning, deep learning, and/or the like). Artificial intelligence thus comprises a wide variety of technologies underpinned by machine learning. Such technologies are being used to build advanced artificial intelligence solutions that not only create new value in digital enterprises, but also help redefine how these enterprises function through new products and processes.

Machine learning is a field of study that gives computers the ability to learn without being explicitly programmed. It consists of a class of algorithms with an emphasis on learning rather than just computer programming. Machine learning constitutes a subset of core technologies included under artificial intelligence, which enables machines to learn patterns based on data. In machine learning, a device utilizes complex algorithms to analyze a massive amount of data, recognize patterns among the data, and make a prediction without requiring a person to program specific instructions into the device's software. Deep learning is a subset of machine learning, and utilizes massive amounts of data and computing power to train deep neural networks. Neural networks are a set of algorithms, modeled loosely after the human brain, that are designed to recognize patterns. They usually consist of an input layer, an output layer and one or more hidden layers. Deep neural networks typically consist of a large number of hidden layers and use more complex algorithms to map correlations between data attributes and enable machines to perform tasks such as classification, correlation, similarity and anomaly detection. Deep Learning networks are capable of transfer learning, i.e. a pre-trained network can be updated to apply its learning to a new dataset. Due to their ability to learn more complex patterns, deep neural networks have set new records of accuracy in fields such as image classification, text recognition and related applications.

SUMMARY

According to some implementations, a device may include one or more memories, and one or more processors, communicatively coupled to the one or more memories, to receive a model and data for the model, wherein the model may include an artificial intelligence model or a machine learning model. The one or more processors may identify training data and scoring data for the model based on the data, and may remove bias from the training data to generate unbiased training data. The one or more processors may train the model with the unbiased training data to generate a plurality of trained models, and may process the plurality of trained models, with the scoring data, to generate scores for the plurality of trained models. The one or more processors may evaluate and select a trained model, from the plurality of trained models, based on model metrics and the scores, and may create a training sample for the trained model based on the unbiased training data and production data associated with a production environment in which the trained model is to be utilized. The one or more processors may create a production sample based on the production data and the training sample, and may process the training sample and the production sample, with the trained model, to generate first results associated with the training sample and second results associated with the production sample. The one or more processors may validate the trained model for use in the production environment based on the first results and the second results, and may provide the trained model to be used in the production environment based on validating the trained model.

According to some implementations, a non-transitory computer-readable medium may store instructions that include one or more instructions that, when executed by one or more processors of a device, cause the one or more processors to identify, from received data, training data and scoring data for a model. The one or more instructions may cause the one or more processors to train the model with the training data to generate a plurality of trained models, and process the plurality of trained models, with the scoring data, to generate scores for the plurality of trained models. The one or more instructions may cause the one or more processors to select a trained model, from the plurality of trained models, based on model metrics and the scores, and process a training sample, with the trained model, to generate first results, wherein the training sample may have been created based on the training data and production data associated with a production environment in which the trained model is to be utilized. The one or more instructions may cause the one or more processors to process a production sample, with the trained model, to generate second results, wherein the production sample may have been created based on the production data and the training sample. The one or more instructions may cause the one or more processors to validate the trained model for use in the production environment based on the first results and the second results match, and provide the trained model to be used in the production environment based on validating the trained model.

According to some implementations, a method may include identifying training data and scoring data for a model, and removing bias from the training data to generate unbiased training data. The method may include training the model with the unbiased training data to generate a plurality of trained models, and processing the plurality of trained models, with the scoring data, to generate scores for the plurality of trained models. The method may include selecting a trained model, from the plurality of trained models, based on model metrics and the scores, and processing a training sample, with the trained model, to generate first results, wherein the training sample has been created based on the unbiased training data and production data associated with a production environment in which the trained model is to be utilized. The method may include processing a production sample, with the trained model, to generate second results, wherein the production sample has been created based on the production data and the training sample, and providing the trained model for use in the production environment based on the first results and the second results.

BRIEF DESCRIPTION OF THE DRAWINGS

FIGS. 1A-1H are diagrams of an example implementation described herein.

FIGS. 4-6 are flow charts of example processes for training, validating, and monitoring artificial intelligence and machine learning models.

DETAILED DESCRIPTION

Figure 1B:
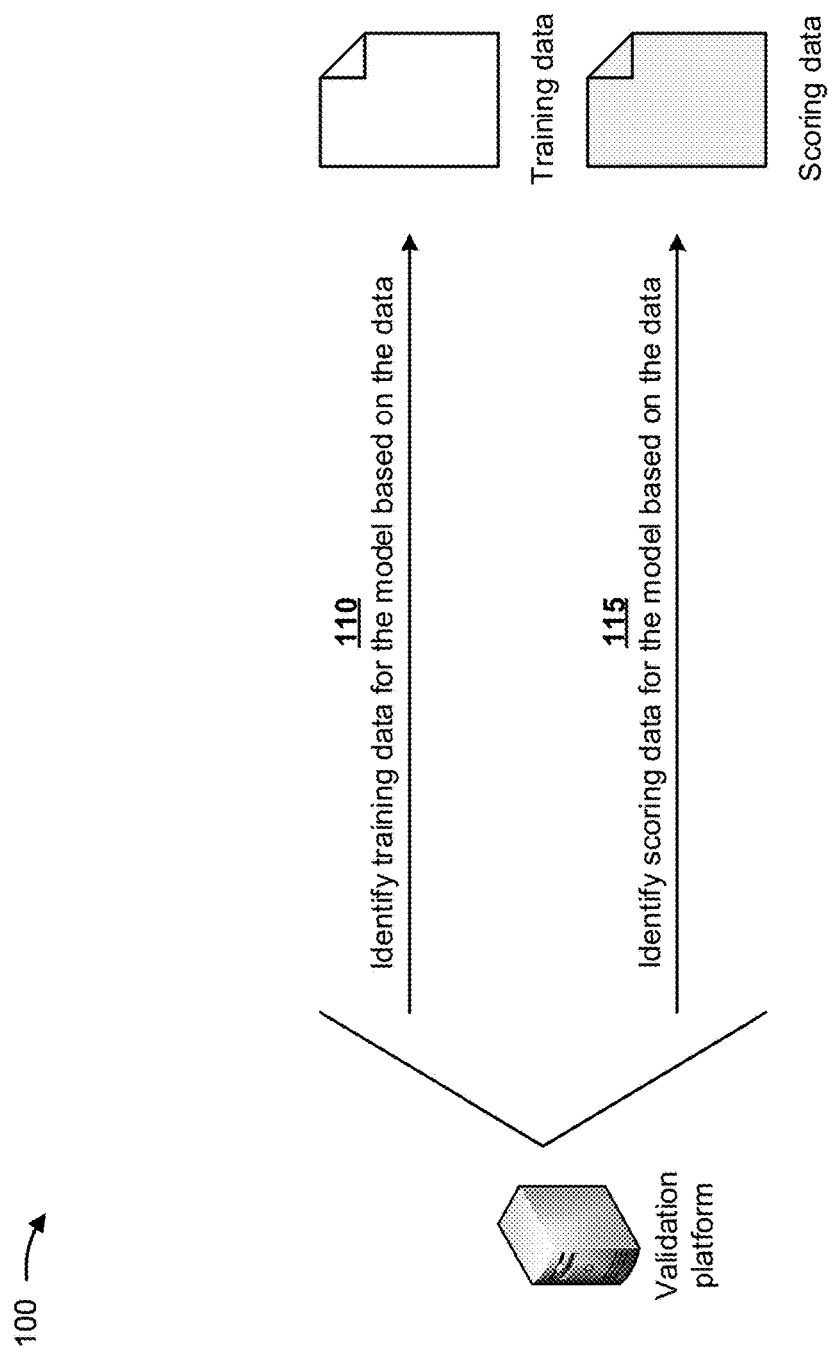

The following detailed description of example implementations refers to the accompanying drawings. The same reference numbers in different drawings may identify the same or similar elements.

Machine learning and artificial intelligence have found great success in practical applications. Computer vision, speech recognition, and language translation have all seen a near human level performance with the help of machine learning and artificial intelligence. Many business applications will also utilize some form of artificial intelligence and/or machine learning. Testing and validating applications that utilize artificial intelligence and/or machine learning models requires a different approach since artificial intelligence and/or machine learning include new paradigms in development lifecycles, such as choice of correct artificial intelligence and/or machine learning parameters, complexity of training and evaluating artificial intelligence and/or machine learning models, data processing in large volumes, managing a variety of data, outcomes being probabilistic rather than deterministic, ensuring ethical and unbiased decision making by artificial intelligence and/or machine learning, regulatory and compliance adherence of artificial intelligence and/or machine learning, and/or the like. However, testing and validating such applications is extremely challenging and very expensive with current testing methodologies.

Some implementations described herein provide a validation platform that trains, validates, and monitors artificial intelligence and machine learning models. For example, the validation platform may identify training data and scoring data for a model, and may remove bias from the training data to generate unbiased training data. The validation platform may train the model with the unbiased training data to generate a plurality of trained models, and may process the plurality of trained models, with the scoring data, to generate scores for the plurality of trained models. The validation platform may select a trained model, from the plurality of trained models, based on model metrics and the scores, and may process a training sample, with the trained model, to generate first results. The training sample may be created based on the unbiased training data and production data associated with a production environment in which the trained model is to be utilized. The validation platform may process a production sample, with the trained model, to generate second results, wherein the production sample may be created based on the production data and the training sample. The validation platform may provide the trained model for use in the production environment based on the first results and the second results.

In this way, the validation platform may provide a consistent approach to testing and validating artificial intelligence and machine learning models (e.g., referred to herein as models). The validation platform utilizes a debiasing method to identify bias in a data set, neutralize the data set, and automatically generate an equalized data set. The validation platform may identify problems in the models, may determine correctness of the models, and may recommend metrics to ascertain accuracy and relevance of the models. Upon successful completion of training and validating, the models are ready to be deployed in production environments. The validation platform may provide ongoing monitoring and evaluation of the models in the production environments, at regular intervals, to identify deviations, retrain the models, and/or the like.

FIGS. 1A-1H are diagrams of an example implementation 100 described herein. As shown in FIG. 1A, and by reference number 105, a validation platform may receive a model and data for the model from a variety of sources. In some implementations, the sources may include a client device, a server device, a data structure, and/or the like. In some implementations, a model may include a set of parameters learned from data, which enable creating outcomes on new data observations. In some implementations, the model may include one or more models. In some implementations, the model may include an artificial intelligence model (e.g., a multiple regression analysis model, an artificial neural networks (ANNs) model, a case-based reasoning (CBR) model, and/or the like), a machine learning model (e.g., a supervised learning model, an unsupervised learning model, a linear regression model, a logistic regression model, a naïve Bayes model, and/or the like), a deep learning model (e.g., a recurrent neural network (RNN) model, a convolution deep neural network (CNN) model, and/or the like), and/or the like.

In some implementations, the data may include online data (e.g., data received from the Internet), offline data (e.g., data received from a source other than the Internet), historical data in which both inputs and expected outputs are present, and/or the like, that is associated with the model. In some implementations, depending on the type of model, the data can be either structured data (e.g., from traditional business systems), human sourced data from social networks, machine generated data (e.g., data from instrumentation, sensor data, operational data, and/or the like), dark data (e.g., unstructured data, such as hand written notes), and/or the like. For example, if the model is to provide automatic email spam detection, the data may be a corpus of emails that includes spam emails and non-spam emails. In another example, if the model is to identify objects in images (e.g., for autonomous vehicle operation), the data may be a corpus of images and/or videos that includes objects associated with vehicle travel (e.g., other vehicles, pedestrians, road signs, traffic signals, road lines, and/or the like).

In some implementations, the validation platform may be associated with a data structure (e.g., a database, a table, a list, and/or the like), and the validation platform may store the model and the data in the data structure. In some implementations, the validation platform may store the model and the data in the data structure when the model and the data are received from one of the sources.

In some implementations, the validation platform may pre-process the data before storing the data in the data structure. For example, the validation platform may utilize one or more pre-processing techniques to pre-process the data, such as data cleansing techniques, data reduction techniques, data transformation techniques, and/or the like. In some implementations, the validation platform may select the one or more pre-processing techniques based on a variety of factors, such as a type associated with the data (e.g., video data, image data, text data, and/or the like), whether a source of the data provides voluminous data that needs to be cleaned and/or reduced in size, whether the data is provided in a format that requires conversion to a particular format that may be utilized by the validation platform, and/or the like.

In some implementations, the data cleansing techniques may include techniques that detect and correct (or remove) corrupt or inaccurate records from the data, and that identify incomplete, incorrect, inaccurate, or irrelevant portions of the data and replace, modify, or delete the identified portions of the data. In some implementations, the data reduction techniques may include techniques that transform numerical or alphabetical digital information (e.g., the data) into a corrected, ordered, and simplified form, and that reduce a quantity of the data to meaningful parts. In some implementations, the data transformation techniques may include techniques that convert the data from one format or structure into another format or structure. The data transformation may be simple or complex based on required changes to the data between source (initial) data and target (final) data.

In some implementations, the validation platform may pre-process the data by determining correlations, general trends, outliers, and/or the like associated with the data, and by performing an analysis of the data based on histograms, scatter plots, box plots, and/or the like determined based on the correlations, general trends, outliers, and/or the like associated with the data. In such implementations, the validation platform may further pre-process the data by cleaning the data based on inconsistent values, duplicate records, invalid entries, and/or the like, by merging duplicate records based on industry-specific domain knowledge, and by transforming and scaling the data using data manipulation and feature detection.

As shown in FIG. 1B, and by reference numbers 110 and 115, the validation platform may identify training data for the model based on the data, and may identify scoring data for the model based on the data. In some implementations, the validation platform may store the training data and scoring data in the data structure (e.g., a database, a table, a list, and/or the like). In some implementations, the validation platform may split the data into at least the training data (e.g., where 70%, 80%, 90%, etc. of the data is utilized as the training data) and the scoring data (e.g., where 30%, 20%, 10%, etc. of the data is utilized as the scoring data). The training may include data utilized by the validation platform to train the model. The scoring data may include data that is not processed by the model during the training process, but may be used to evaluate performance of the model. In some implementations, the scoring data may be identified from the same data as the training data (e.g., and from the same data that is expected to be evaluated by the model in a production environment). In some implementations, the scoring data may be created as out-of-time data (e.g., if the scoring data includes data from a time window separate from the training data) to test a generalization capacity of the model to data in different time windows.

In some implementations, the validation platform may utilize one or more techniques to identify the training data. For example, the validation platform may utilize a temporal data selection technique to identify the training data. If one year of data is available and seasonality is not a factor in the performance of the model, the validation platform may utilize a portion of the data (e.g., three quarters of the data) for training data and a remaining portion of the data (e.g., a quarter portion of the data) for scoring data. In another example, the validation platform may ensure that data associated with boundary conditions (e.g., annuity events, festivals, holidays) are covered during training and included in the training data.

In another example, the validation platform may prevent splitting of the data by entities by assigning data associated with a particular entity to the training data or the scoring data, rather than splitting such data between the training data and the scoring data. In another example, the validation platform may include positive and negative outcomes in the training data (e.g., for a mortgage risk recommendation model, the training data may include data associated with successful mortgages and unsuccessful mortgages). In another example, the validation platform may identify the training data to ensure that the scoring data includes enough observations to achieve statistical significance for evaluation results.

Figure 1C:
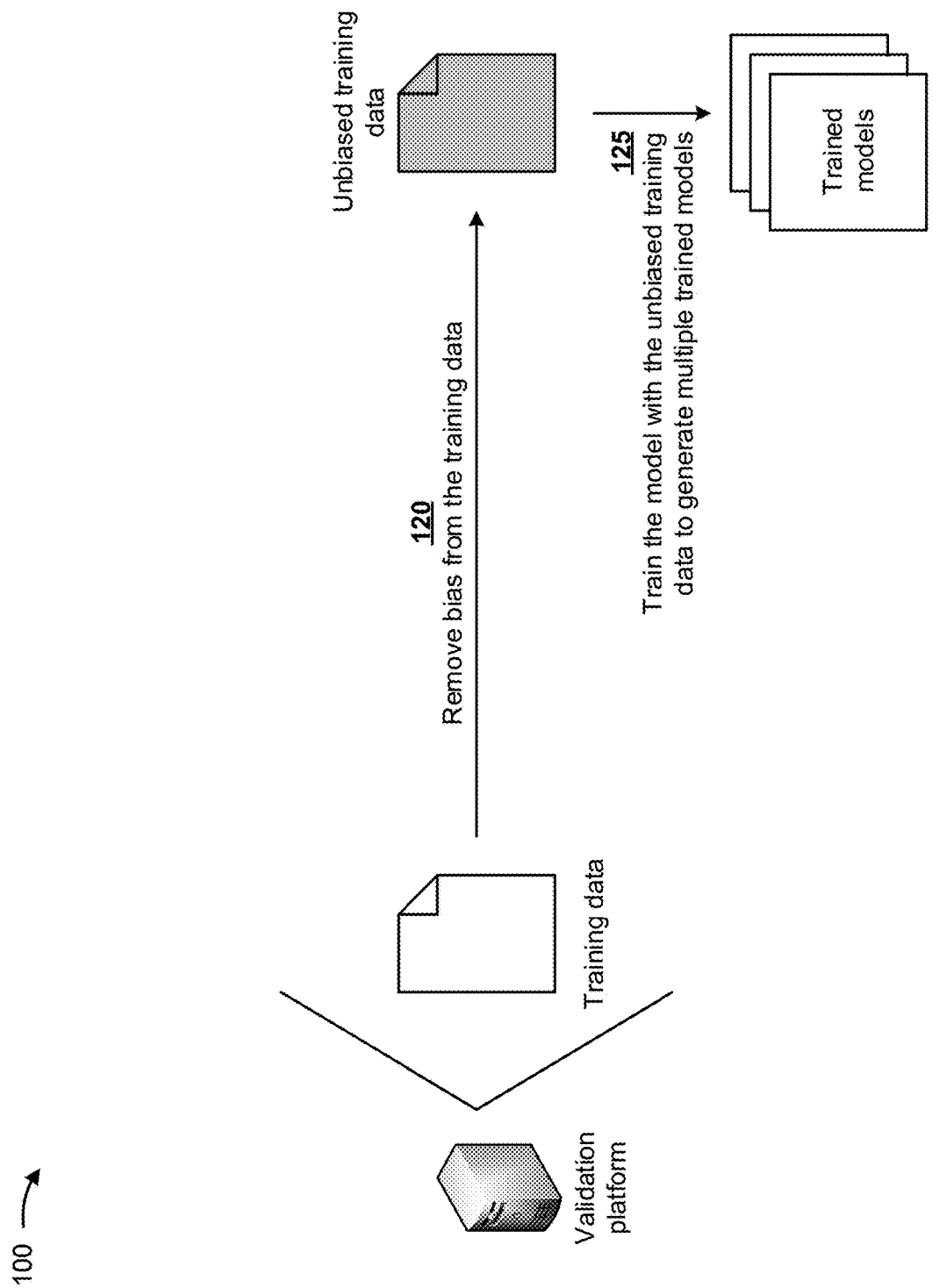

As shown in FIG. 1C, and by reference number 120, the validation platform may remove bias (e.g., outcomes that are disproportionately skewed with respect to a particular input data attribute) from the training data to generate unbiased training data. In some implementations, the validation platform may identify and address a number of biases, such as gender bias, ethnic and racial bias, economic bias, and/or the like, associated with the training data. In some implementations, the validation platform may remove bias from the scoring data in a similar manner as described herein for the training data. In some implementations, the validation platform may detect bias in the training data and may generate neutral data (e.g., the unbiased training data) by neutralizing and equalizing the bias in the training data.

In some implementations, the validation platform may prevent unethical behavior associated with the training data. Since models learn from humans via historic data, both good and bad data may be provided in training data and the models may learn unwarranted associations from the training data. For example, chatbots may learn from social media feeds that contain both positive and negative sentiments, and may learn to behave like humans (e.g., even racist behaviors). To avoid learning such negative behavior, a model may be exposed to negative social media inputs during the training phase with a scripted response to handle non-ethical comments. In the scoring phase, the model may be tested with non-ethical data to check if the model generates an acceptable response.

In some implementations, the validation platform may prevent gender and ethnic bias associated with the training data. Models may adhere to certain regulatory norms, such as, for example, a regulation to be gender and ethnicity neutral (e.g., models may not change scoring depending on a gender or an ethnicity of an individual). To ensure compliance, the validation platform may train a model with a representation of positive and negative data across genders and ethnic groups, which may prevent bias in an output recommendation of the model in production. For example, for a loan or insurance policy recommendation model, the training data may approve and/or reject applications of females and applications of males in equal measure. The training data may include a representation of various ethnic groups that exist in a geography, and may include all ethnicities with approvals and/or rejections of applications. This may prevent gender bias and ethnic bias from being included in the model. In some implementations, the validation platform may ensure compliance with gender and/or ethnic neutrality by modifying only a gender parameter during a scoring phase and checking if a result remains the same.

In some implementations, the validation platform may ensure regulatory and compliance adherence associated with the training data. There are various industry compliance norms and regulations that enterprises may adhere to. For example, a credit risk model may successfully verify credit compliance if the training data used includes high quality data that passes regulatory checks. The model may be trained to reject applications that do not meet regulations. For example, in a credit risk model, if a person is denied credit, there are regulations that force companies to explain to the person why they were denied credit. In some implementations, the training data may inform the rationale of a model. In some implementations, a third party (e.g., an auditor from the compliance team) may be utilized to understand the model.

In some implementations, the validation platform may remove the biases from the training data with a debiasing model that accepts an extract of the training data as input and generates an output graph highlighting biases. The debiasing model may utilize word embeddings to detect bias in the training data. A word embedding is a collective name for a set of language modeling and feature learning techniques in natural language processing (NLP) where words or phrases from a vocabulary are mapped to vectors of real numbers in a semantic manner. In some implementations, the debiasing model may utilize frequency-based word embeddings (e.g., count vectors, term frequency-inverse document frequency (TF-IDF), a co-occurrence matrix, and/or the like), prediction based embeddings (e.g., continuous bag of words, skip-gram, and/or the like), and/or the like.

For example, the validation platform may remove gender bias from the training data in the following manner. The validation platform may extract only textual data from the training data and may collate the training data. The validation platform may explore a textual data distribution associated with the training data by analyzing an overall distribution of training data and analyzing a distribution of the training data that is specific to gender bias. The validation platform may create word embeddings based on the training data by using a deep learning model (e.g., a skip-gram model, a continuous bag of words model, and/or the like) with a hierarchical SoftMax sampling or a negative sampling. The validation platform may evaluate the word embeddings by assessing a quality of newly created word embeddings using an exhaustive list of similarity pairs and analogy triads and by performing an exploratory analysis of the word embeddings. The validation platform may debias the word embeddings by identifying a gender subspace, by hard debiasing (e.g., neutralize and equalize) or soft bias correction, by evaluating a quality of the debiased word embeddings for bias scenarios and other generic cases, and by outputting the debiased word embeddings.

As further shown in FIG. 1C, and by reference number 125, the validation platform may train the model with the unbiased training data to generate multiple trained models. In some implementations, the validation portion may train the model with different portions of the unbiased training data to generate the multiple trained models. In some implementations, the validation platform may train the model with all of the unbiased training data to generate a single trained model.

In some implementations, the validation platform may perform a training operation on the model with the unbiased training data. For example, the validation platform may separate the data into a training set, a scoring set, a test set, and/or the like. In some implementations, the validation platform may train the model using, for example, an unsupervised training procedure and based on the unbiased training data. For example, the validation platform may perform dimensionality reduction to reduce the unbiased training data to a minimum feature set, thereby reducing resources (e.g., processing resources, memory resources, and/or the like) to train the model, and may apply a classification technique, to the minimum feature set.

In some implementations, the validation platform may use a logistic regression classification technique to determine a categorical outcome. Additionally, or alternatively, the validation platform may use a naïve Bayesian classifier technique. In this case, the validation platform may perform binary recursive partitioning to split the unbiased training data into partitions and/or branches, and use the partitions and/or branches to perform predictions. Based on using recursive partitioning, the validation platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the validation platform may use a support vector machine (SVM) classifier technique to generate a non-linear boundary between data points in the unbiased training data. In this case, the non-linear boundary is used to classify test data into a particular class.

Additionally, or alternatively, the validation platform may train the model using a supervised training procedure that includes receiving input to the model from a subject matter expert, which may reduce an amount of time, an amount of processing resources, and/or the like to train the model of activity automatability relative to an unsupervised training procedure. In some implementations, the validation platform may use one or more other model training techniques, such as a neural network technique, a latent semantic indexing technique, and/or the like. For example, the validation platform may perform an artificial neural network processing technique (e.g., using a two-layer feedforward neural network architecture, a three-layer feedforward neural network architecture, and/or the like) to perform pattern recognition with regard to patterns. In this case, using the artificial neural network processing technique may improve an accuracy of the trained models generated by the validation platform by being more robust to noisy, imprecise, or incomplete data, and by enabling the validation platform to detect patterns and/or trends undetectable to human analysts or systems using less complex techniques.

Figure 1D:
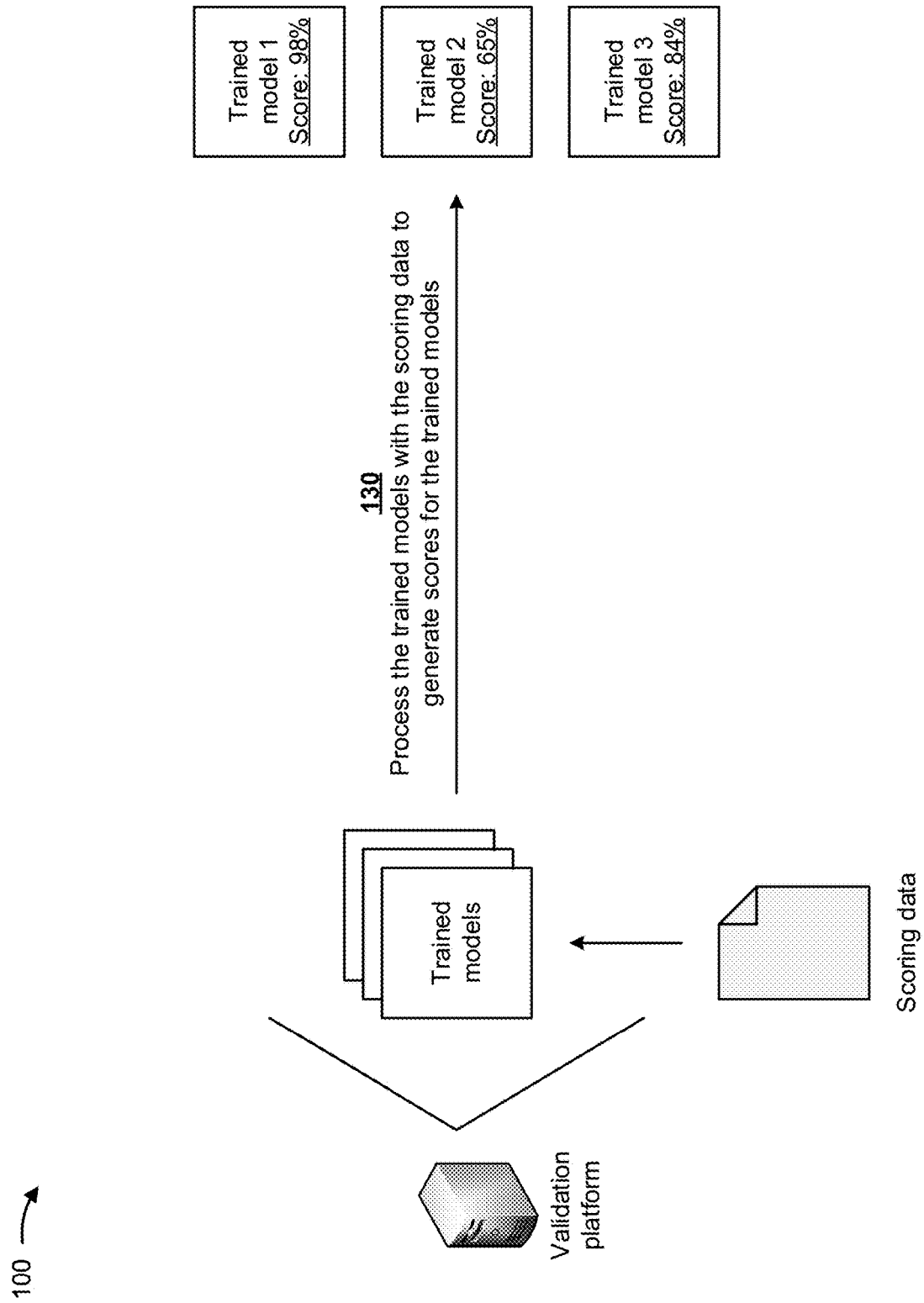

As shown in FIG. 1D, and by reference number 130, the validation platform may process the trained models with the scoring data to generate scores for the trained models. For example, as shown, the validation platform may generate a score of 98% for a first trained model, a score of 65% for a second trained model, and a score of 84% for a third trained model. One area to test when evaluating a trained model is to ensure that an output score of the trained model is being computed correctly. This may be particularly important if the trained model is transferred to a different scoring database for obtaining output scores. In such situations, the validation may create a small sample of training observations, may score the observations based on the training data and the scoring data, and may compare the scores for each observation.

In addition to this quantitative validation, the validation platform may perform a qualitative validation of the score distribution by creating score histograms, plots, tables, and/or the like for the training data, the scoring data, and the validation data. The histograms may depict a percentage of observations falling within each of the training data, the scoring data, and the validation data. If the model training has not completed successfully or the training has not executed correctly, the validation platform may identify a score distribution that is not aligned with a sample population. This may indicate an incomplete training process or some other problem in the training data that has led to a non-optimized set of weights (e.g., creating an unusual score distribution). However, a nature of an expected score distribution may be highly dependent on a problem addressed by a model. For example, in a fraud detection problem, a majority of a test population may be non-fraudulent, which are expected to have a large concentration in a lowest score range. Hence, an expected score distribution may be greatly skewed towards a lowest score. Another example is the problem of predicting customer churn, where most of a test population may be non-churns and a score distribution may be towards a lower score.

Figure 1E:
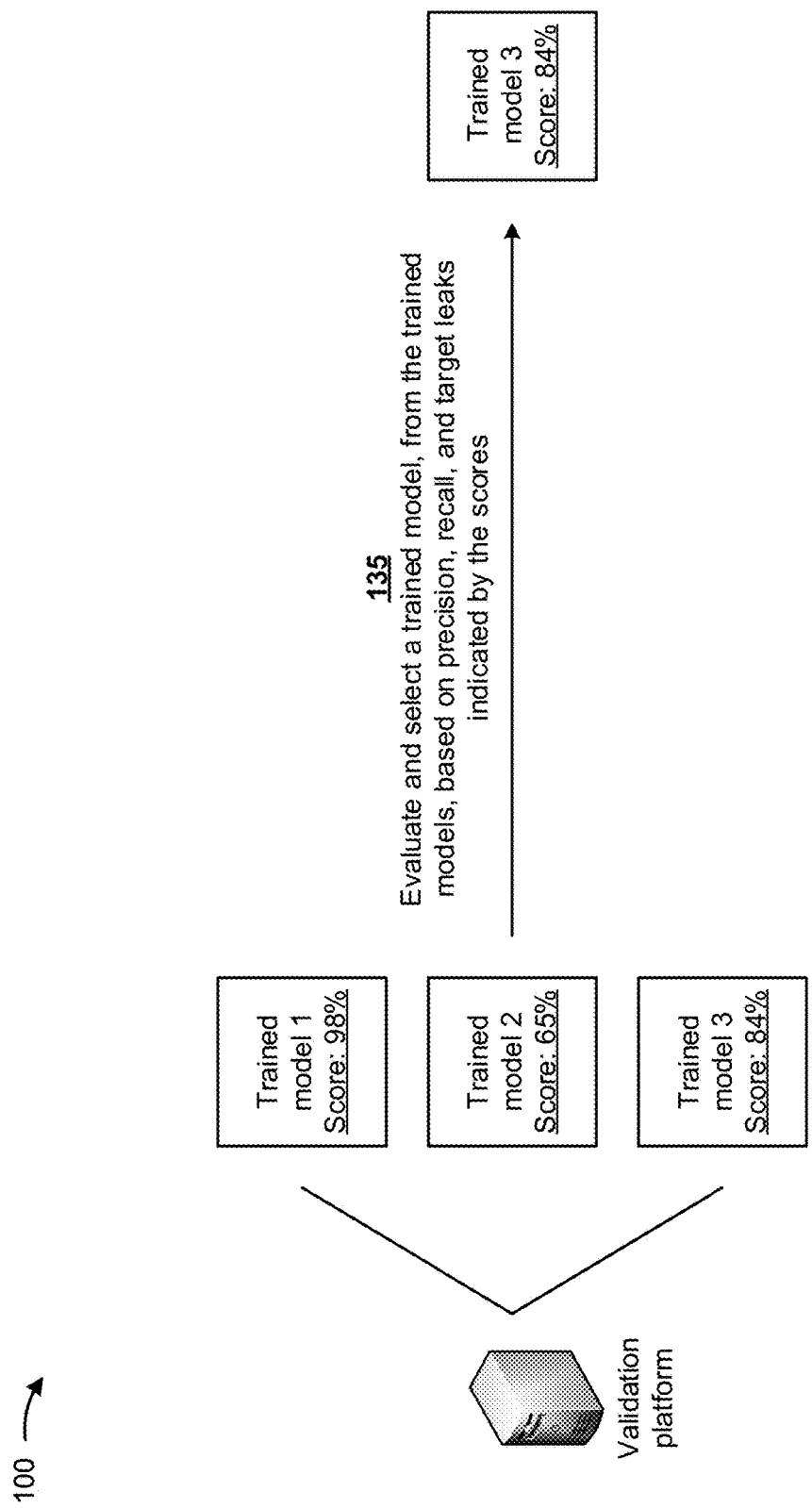

As shown in FIG. 1E, and by reference number 135, the validation platform may evaluate and select a trained model, from the multiple trained models, based on precision, recall, and target leaks (e.g., described below) indicated by the scores. For example, the validation platform may evaluate the multiple trained models based on precision, recall, and target leaks indicated by the scores, and may select the third model based on the evaluation. Supervised models may include classification models and regression models. Classification models may include categorical outputs while regression models may include numeric outputs. If a model is trained to differentiate between two classes, the model may be termed a binary classification model, or else the model may be termed a multi-class classification model. In some implementations, the validation platform may utilize evaluation metrics associated with binary classification to evaluate the multiple trained models and to select the trained model from the multiple trained models.

Binary classification models may be used in several scenarios. For example, the spam detection model and problem, described above, may be a binary classification problem. A binary classification model may determine a likelihood of a particular event occurring, such as fraud detection, a probability of a flight delay or an invoice processing delay, a likelihood of rain on a given day, and/or the like. Binary classification models may be evaluated using tradeoff metrics, such as precision and recall. For example, in the spam detection problem, the model may identify a large number of spam emails as spam (e.g., recall) and may minimize a wrong identification of emails as spam (e.g., precision). In some implementations, the validation platform may utilize common pairs of metrics to evaluate a trade-off, such as precision and recall, sensitivity and specificity, type A and type B errors, and/or the like.

In some implementations, the validation platform may utilize a model evaluation process to select a best trained model from the multiple trained models based on model performance. In some implementations, the validation platform may ensure, through additional testing, that evaluation data is correct, and that performance metrics have been correctly defined, before comparing metrics across the multiple trained models. In some implementations, the validation platform may compare metrics between the training data and the validation data and may check for continuity of the scores to highlight any issues related to differences or insufficiency of data samples.

In some implementations, precision and recall may operate in accordance with the following example. A model may be used to identify duplicate defects from a dataset of defects for a particular application release. A total number of defects in the dataset may be one-hundred (100), an actual number of duplicate defects may be thirty (30), a number of defects identified by the trained model as relevant duplicates may be twenty (20), a number of correct duplicates identified by the trained model may be ten (10) (e.g., which may be referred to as true positives), and a number of duplicates identified erroneously by the trained model may be ten (10) (e.g., 20−10=10) (e.g., which may be referred to as false positives). Based on these numbers, the validation platform may determine a precision value of 50% (e.g., 10/20=50%) for the trained model (e.g., the precision value may provide a percentage of retrieved data that is relevant). Based on these numbers, the validation platform may determine a recall value of 33% (e.g., 10/30=33%) for the trained model (e.g., the recall value may provide a percentage of relevant data that is retrieved).

In some implementations, desired levels of precision and recall for a given problem may be dictated by the business constraints. In some cases, a user may require a very high level of precision (e.g., when eliminating duplicate products from a catalog) whereas in other cases, a user may tolerate a lower level of precision for a higher recall (e.g., when detecting fraud in credit card transactions). Thus, thresholds for precision and recall may vary for each problem.

Quality of a model may come into question when performance of the model based on the validation dataset is very poor, and when the performance of the model is unexpectedly high (e.g., too good to be true). If performance metrics of a model are very low, the validation platform may determine that model inputs do not have a very strong correlation with model output or, that a complexity of a relationship is too large for the model to learn patterns. In such situations, the validation platform may review the input data and selected fields to identify new data sources that may provide more relevant input data and/or may reselect input fields to enable better correlations to be detected with the output.

In some implementations, if the precision and the recall values (e.g., percentages) are too low, then the validation platform may change the input data, may alter the selected fields of the input data, and/or the like. In some implementations, the trained model may be selected by the validation platform based on a trade-off between accuracy (e.g., precision and recall) and clarity of decision making to a business.

In some implementations, if the model performance is unreasonably high (e.g., 99% recall and 100% precision), the validation platform may examine each of the input fields to determine if there has been a target leak. A target leak is a phenomenon where, in historical data, an input field may have erroneously included the output data. A target leak may be caused by human or mechanical error and may be intentional or unintentional. For example, a data field entitled "Email Source" may be intended to capture a source of an email (e.g., as an internal source or an external source). In historical data, for emails that have been identified as spam, a value of the Email-Source data field may have been changed to invalid. Thus, if the validation platform utilizes the data field as an input, the data field may include a large correlation with the target and the model may provide extremely good performance. However, this performance may not be achieved in production since the value of invalid may not exist in a production environment. In this situation, information about the target variable has leaked into the Email Source data field, thus making it an invalid input. In some implementations, the validation platform may test for such defects by flagging performance metrics and correlations that are greater than particular thresholds, and examining sources of the performance metrics.

In some implementations, data leakage may include leaking scoring phase data into the training data (e.g., for a same customer, some transactions may be included in the training data while other transactions may be included in the scoring data), leaking a correct prediction or a ground truth into the test data (e.g., as described about in the Email Source example), leaking of information from the future into the past (e.g., using a data field that has an indicator for spam versus ham emails), reversing of intentional obfuscation, randomization or anonymization, inclusion of data not present in the training data or the scoring data, and/or the like.

Figure 1F:
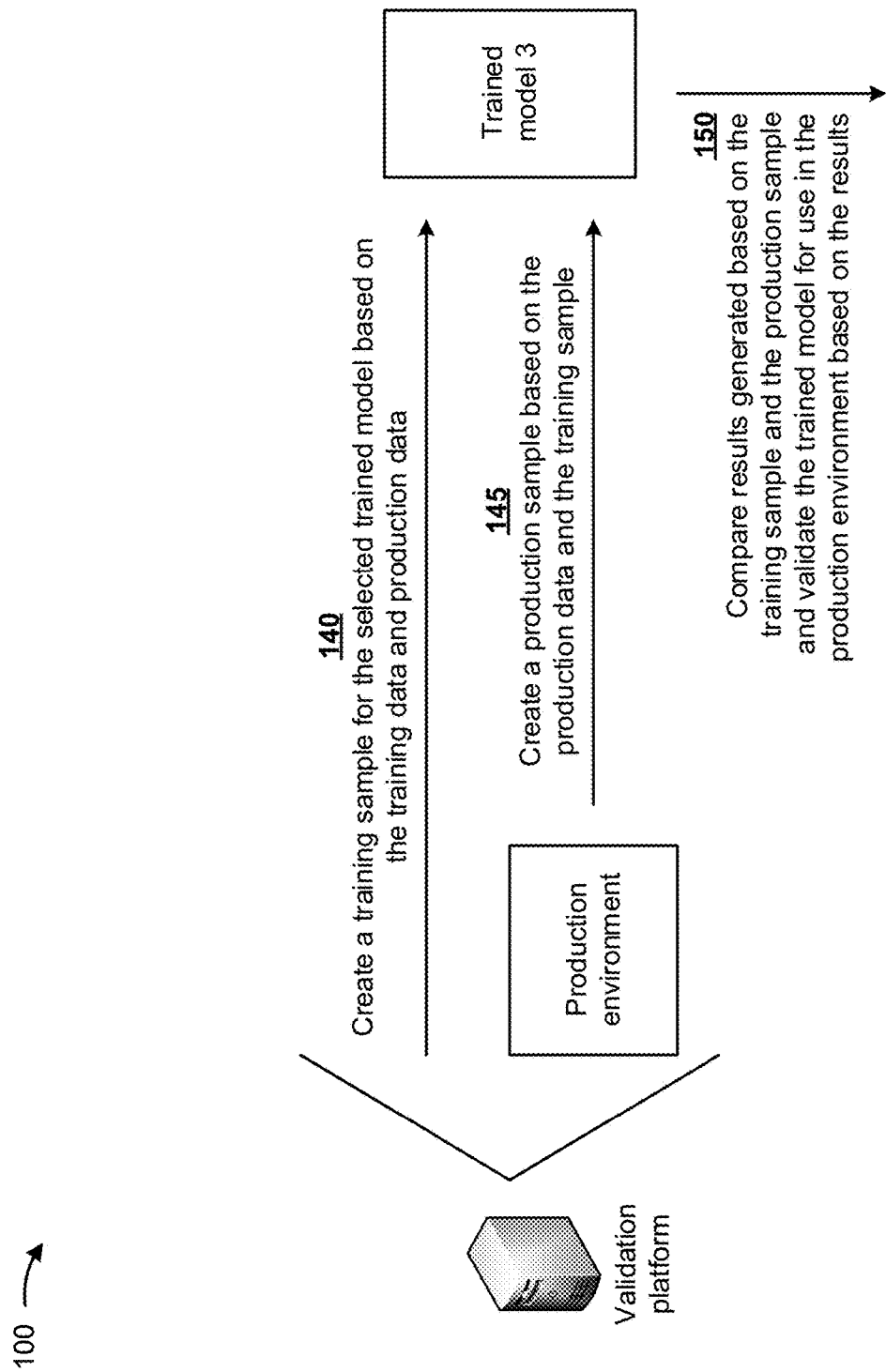

As shown in FIG. 1F, and by reference number 140, the validation platform may create a training sample for the selected trained model based on the training data and production data received from a production environment in which the trained model is to be implemented. As further shown in FIG. 1F, and by reference number 145, the validation platform may create a production sample based on the production data and the training sample. In some implementations, the validation platform may process the training sample and the production sample with the selected trained model to generate results.

In some implementations, when the selected trained model is ready to be deployed in the production environment, the validation platform may test a graphic user interface (GUI) and non-functional requirements associated with the selected trained model, and may test the selected trained model. In some implementations, the validation platform may provide special testing procedures to ensure proper functioning of the selected trained model when the model is deployed into the production environment. A model may experience errors when implemented in a production environment since data being input to the model in the production environment varies from expected data, coding of feature inputs in the production environment does not match feature coding in a development environment, the model implemented in the production environment differs from the model implemented in the development environment, post-processing of the model score in the production environment is not correctly coded to capture performance requirements, and/or the like.

In order to identify such potential errors, the validation platform may create different validation samples, and may determine model scores for each validation sample. In some implementations, the validation platform may determine that deployment code of the selected trained model is accurate, and that the selected trained model inputs and outputs are calculated correctly, thus verifying that the selected trained model has been correctly implemented in the production environment. In some implementations, the validation platform may ensure that the data from upstream systems (e.g., in the production environment), of the selected trained model, is expected and matches the input data used when developing the selected trained model.

In some implementations, the validation platform may sample several observations from the training data (e.g., small percentage of the data, a few thousand observations, and/or the like), and may determine raw data inputs, selected input fields, an expected score, and post-processed values for each of the observations. The training sample may include the sampled observations, the raw data inputs, the selected input fields, the expected score, and the post-processed values for each of the observations. In some implementations, the training sample may address a seasonality of the data where the selected trained model performs well during certain months and does not perform well during other months. In some implementations, the validation platform may create, in the production environment, a test sample that includes the same raw data inputs as the training sample, and the test sample may be the production sample. In some implementations, the validation platform may determine whether the production data provided to the selected trained model is derived from a same population as the training data. In such implementations, the validation platform may create distribution metrics of the raw input data, and may compare the created distribution metrics to distribution metrics of the training data and the scoring data. If the selected trained model is operating correctly in the production environment, the distribution metrics should be aligned and should not deviate greatly from each other.

As shown in FIG. 1F, and by reference number 150, the validation platform may compare results generated based on processing the training sample and the production sample with the selected trained model, and may validate the selected trained model for use in the production environment based on the results. In some implementations, the validation platform may process the training sample and the production sample with the selected trained model, and may capture output scores and post-processed values from the production environment. The validation platform may compare corresponding scores and/or values between the training sample and the production sample, and may verify that the corresponding scores and/or values match. In this way, the validation platform may ensure that the selected trained model is computing fields, scores, and post-processed values, as expected, in the production environment. In some implementations, comparison metrics, such as precision and recall, may be utilized to compute an accuracy and stability of the selected trained model in the production environment.

Figure 1G:
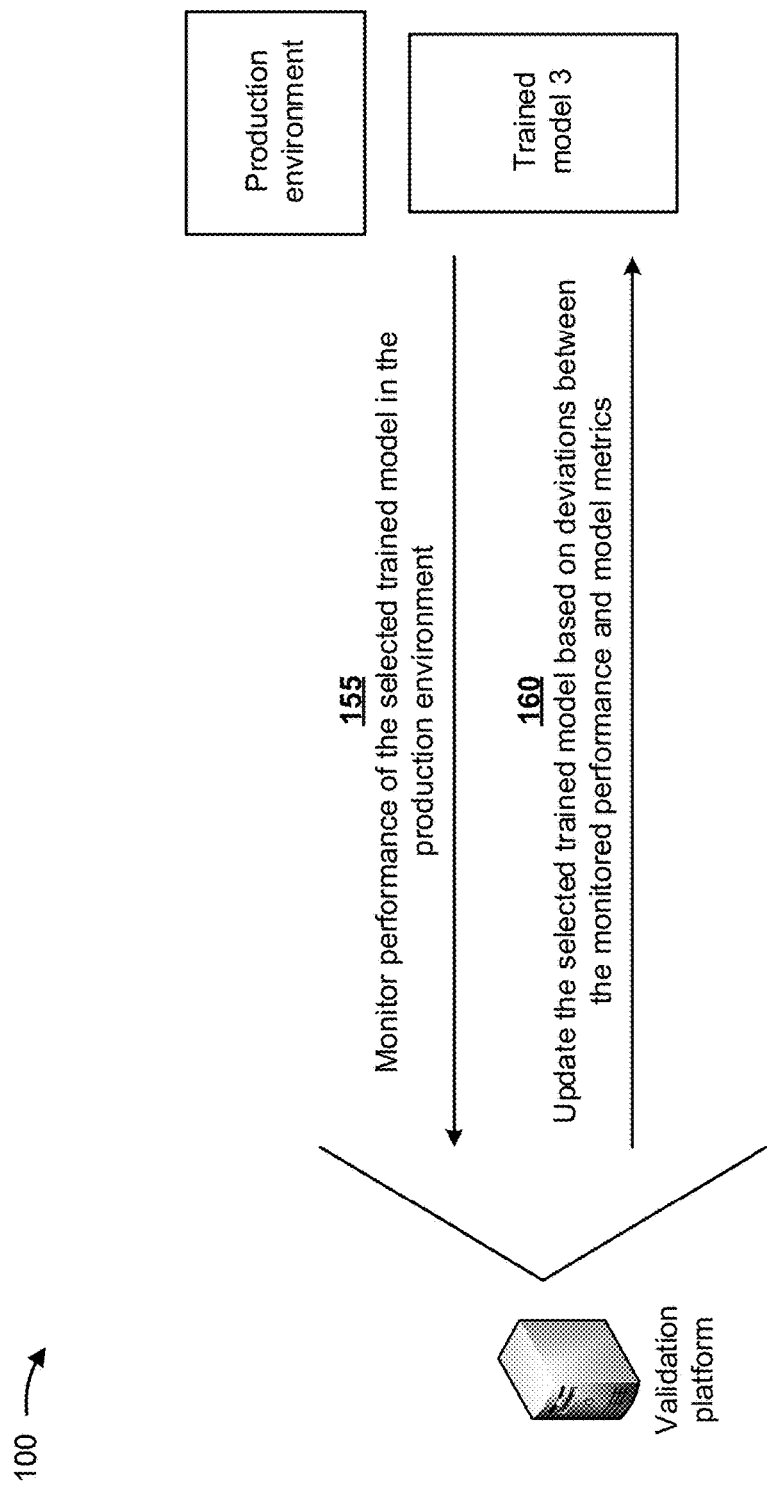

As shown in FIG. 1G, and by reference number 155, the validation platform may monitor performance of the selected trained model in the production environment. Even after the selected trained model is successfully deployed in the production environment, the validation platform may perform regular monitoring of the model inputs and outputs. This is because changes upstream of the selected trained model (e.g., changes in data generating systems, changes in underlying business processes, and/or the like) may change a nature of the raw input data which can have an adverse impact on the performance of the selected trained model. For example, a new feature or a variable added to an application may cause new unexpected data input to the selected trained model on which training has not been provided. The selected trained model may also learn from new human-sourced data or machine-sourced data.

In some implementations, the validation platform may monitor the same metrics that were used to select the model on an ongoing basis to ensure that performance of the selected trained model is sustained as expected. In some implementations, the validation platform may monitor the input data, distribution of scores, and relevant performance evaluation metrics (e.g., precision and recall) for any significant deviations. In some implementations, the validation platform may utilize a common environment to generate and maintain these metrics for newly trained models, as well as models in production, and may provide a common dashboard or interface that includes alarms, identifies rootcauses, and/or the like for any deviations.

As further shown in FIG. 1G, and by reference number 160, the validation platform may update the selected trained model based on deviations between the monitored performance and model metrics. In some implementations, based on the deviations between the monitored performance and the model metrics, the validation platform may retrain the selected trained model at regular intervals to maintain stability of the selected trained model. For example, virtual agents and/or chat bots may learn from new human-sourced data or machine-sourced data and may develop new languages on which the model was not trained. The virtual agents and/or the chat bots may self learn non-ethical and non-compliant data. In such an example, the validation platform may retrain the virtual agents and/or the chat bots with the new human-sourced data or machine-sourced data, and may remove bias from the non-ethical and non-compliant data.

Figure 1H:
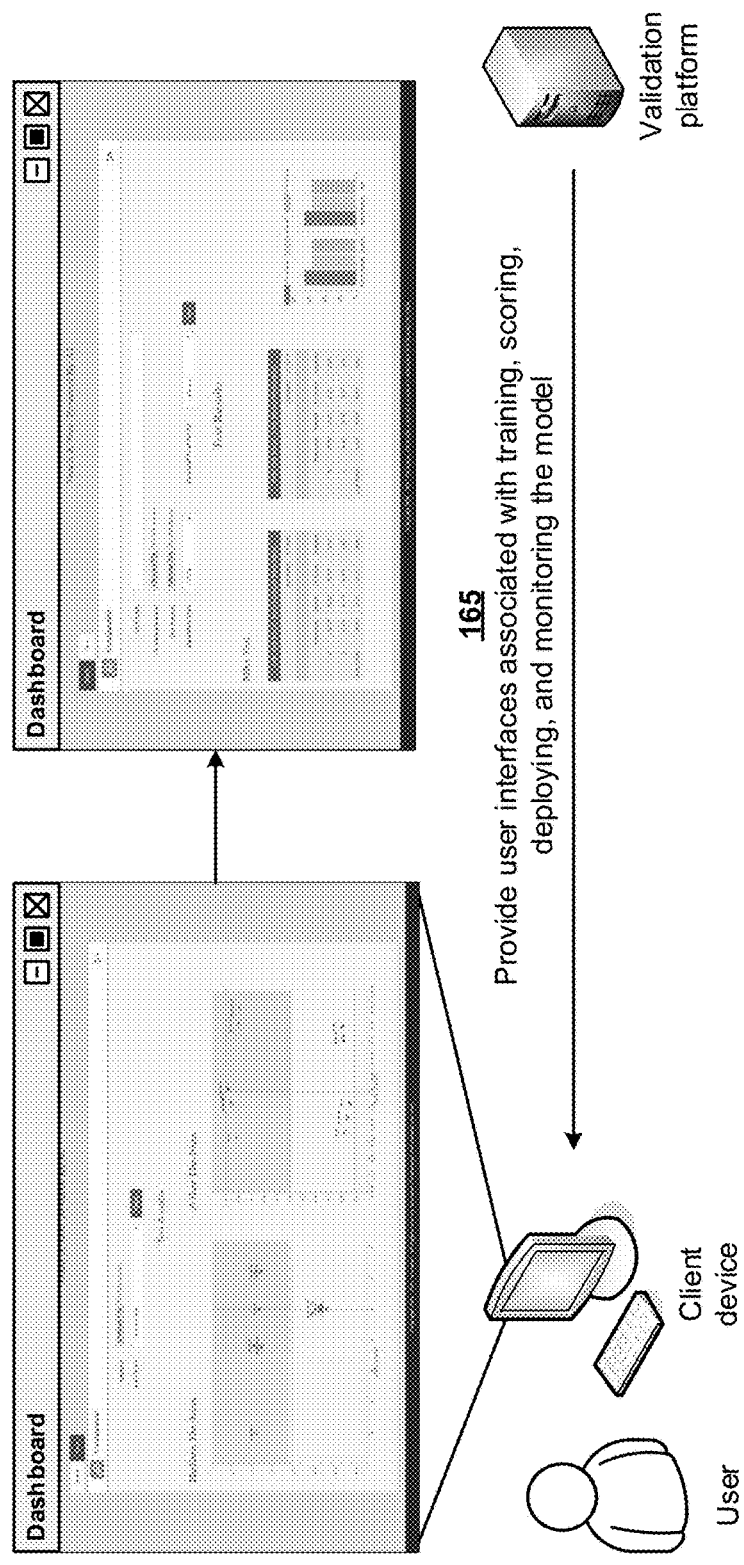

As shown in FIG. 1H, and by reference number 165, the validation platform may provide, to a client device, user interfaces associated with training, scoring, deploying, and monitoring the model. The client device may receive the user interfaces, and may provide the user interfaces for display to a user of the client device. In some implementations, the user interfaces may include user interfaces that display the data received by the validation platform, information associated with the model, the training data, the scoring data, the unbiased training data, scores associated with the multiple models, outputs of the model in a development environment, outputs of the model in the production environment, monitoring results, alarms, deviations in the model in the production environment, and/or the like.

In this way, several different stages of the process for training, validating, and monitoring artificial intelligence and machine learning models are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically trains, validates, and monitors artificial intelligence and machine learning models. Finally, automating the process for training, validating, and monitoring artificial intelligence and machine learning models conserves computing resources (e.g., processing resources, memory resources, and/or the like) that would otherwise be wasted in attempting to generate artificial intelligence and machine learning models for a production environment, and by the production environment.

Furthermore, the validation platform may accelerate model training time, which may conserve computing resources, and may improve an accuracy of the model in a production environment. The validation platform may enable a model to be implemented more quickly in the production environment since defects may be identified or prevented early, and may reduce biased outputs from the model.

As indicated above, FIGS. 1A-1H are provided merely as examples. Other examples are possible and may differ from what was described with regard to FIGS. 1A-1H.

Figure 2:
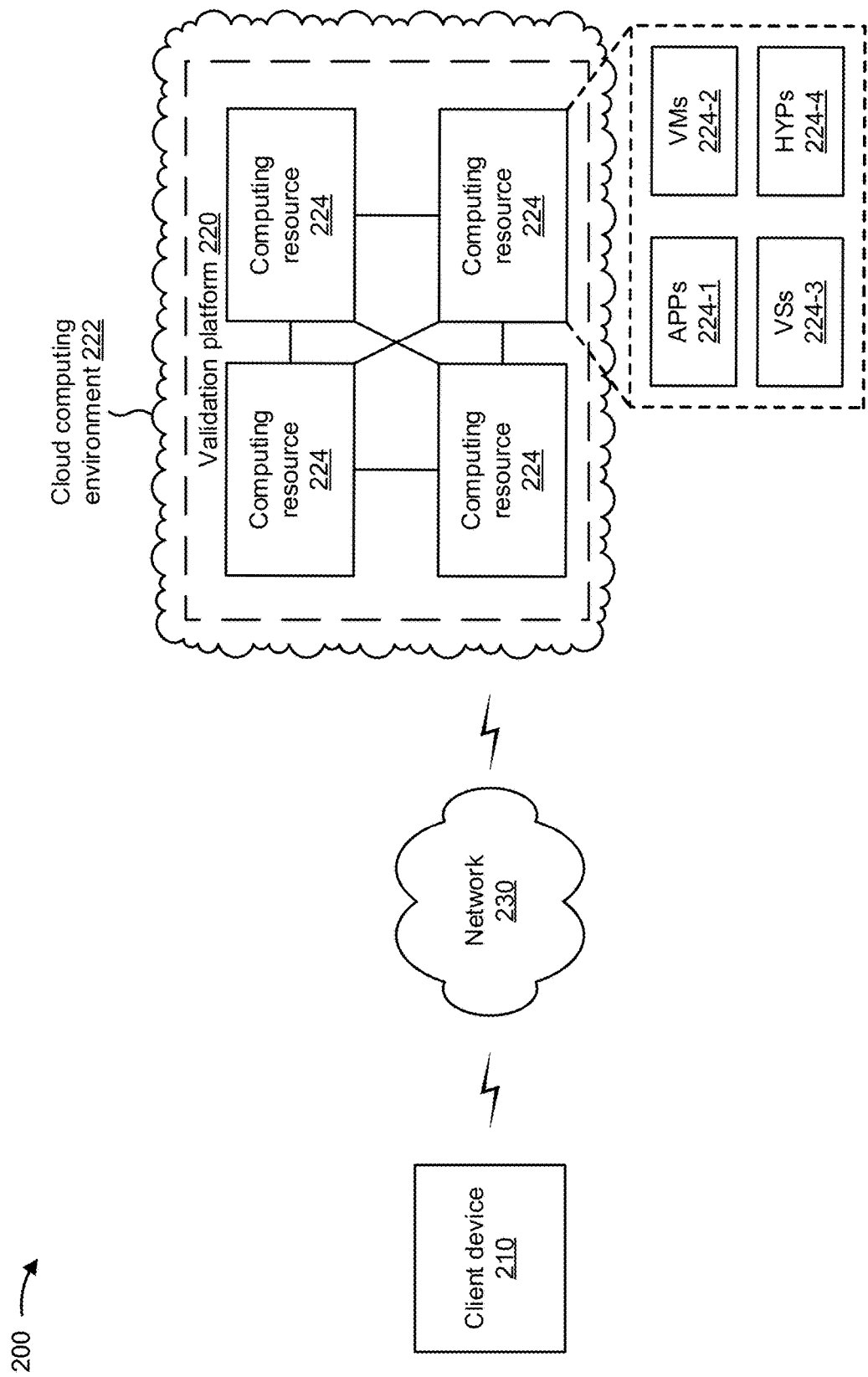
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a validation platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to validation platform 220.

Validation platform 220 includes one or more devices that train, validate, and monitor artificial intelligence and machine learning models. In some implementations, validation platform 220 may be designed to be modular such that certain software components may be swapped in or out depending on a particular need. As such, validation platform 220 may be easily and/or quickly reconfigured for different uses. In some implementations, validation platform 220 may receive information from and/or transmit information to one or more client devices 210.

In some implementations, as shown, validation platform 220 may be hosted in a cloud computing environment 222. Notably, while implementations described herein describe validation platform 220 as being hosted in cloud computing environment 222, in some implementations, validation platform 220 may not be cloud-based (i.e., may be implemented outside of a cloud computing environment) or may be partially cloud-based.

Cloud computing environment 222 includes an environment that hosts validation platform 220. Cloud computing environment 222 may provide computation, software, data access, storage, etc. services that do not require end-user knowledge of a physical location and configuration of system(s) and/or device(s) that host validation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host validation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with validation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of validation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
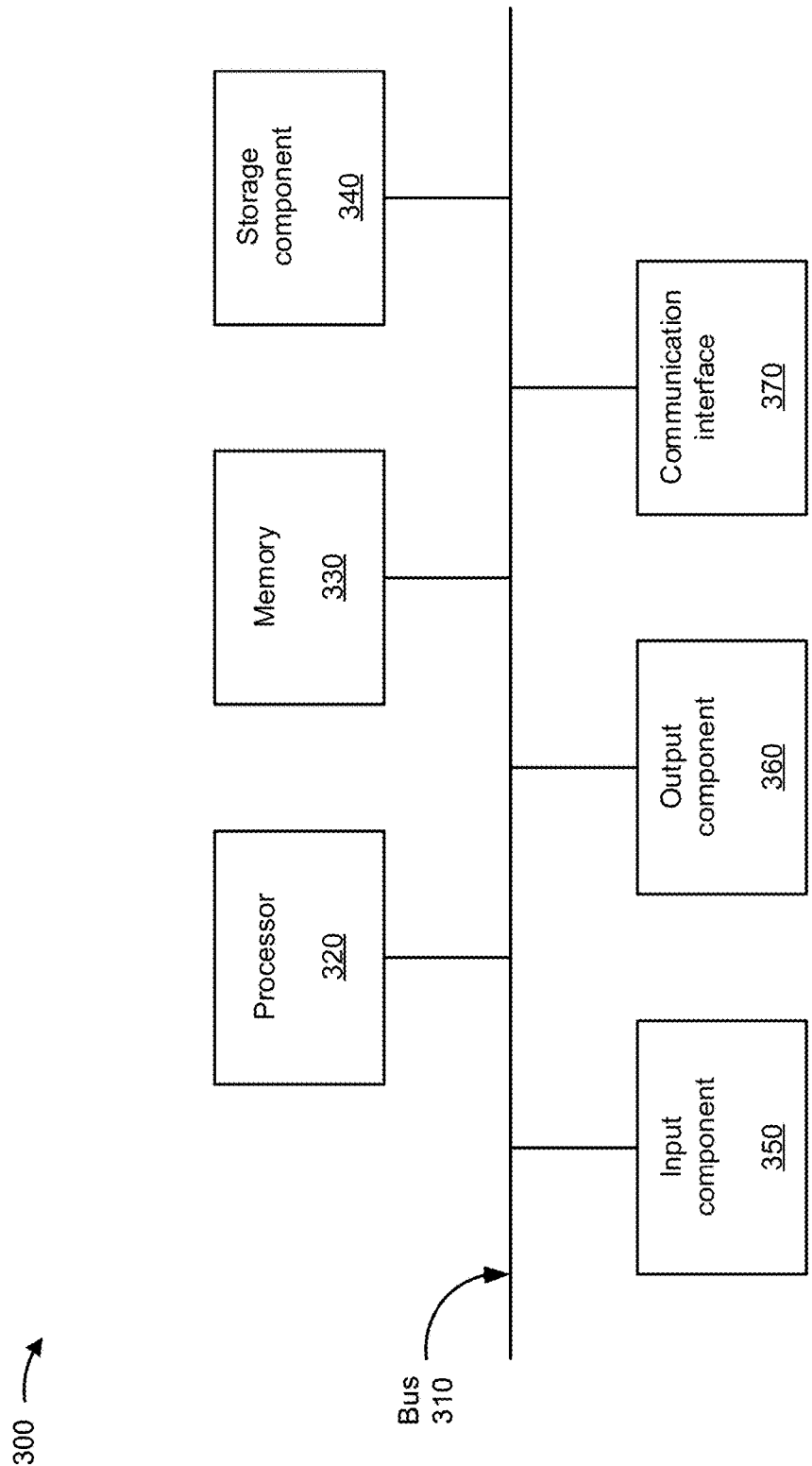
FIG. 3 is a diagram of example components of one or more devices of FIG. 2.

FIG. 3 is a diagram of example components of a device 300. Device 300 may correspond to client device 210, validation platform 220, and/or computing resource 224. In some implementations, client device 210, validation platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
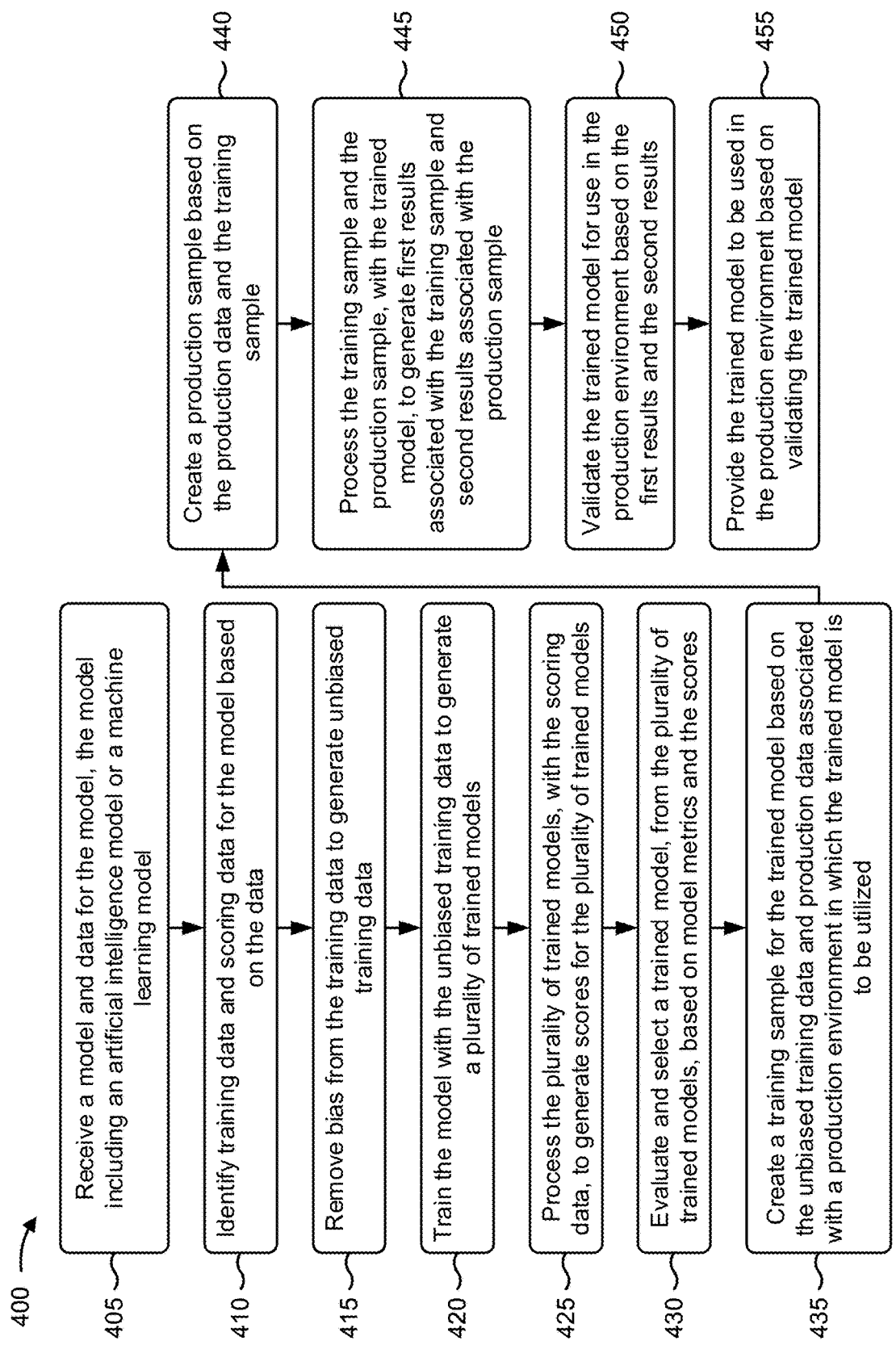

FIG. 4 is a flow chart of an example process 400 for training, validating, and monitoring artificial intelligence and machine learning models. In some implementations, one or more process blocks of FIG. 4 may be performed by a validation platform (e.g., validation platform 220). In some implementations, one or more process blocks of FIG. 4 may be performed by another device or a group of devices separate from or including the validation platform, such as a client device (e.g., client device 210).

As shown in FIG. 4, process 400 may include receiving a model and data for the model, the model including an artificial intelligence model or a machine learning model (block 405). For example, the validation platform (e.g., using computing resource 224, processor 320, communication interface 370, and/or the like) may receive a model and data for the model, as described above in connection with FIGS. 1A-2. In some implementations, the model may include an artificial intelligence model or a machine learning model.

As further shown in FIG. 4, process 400 may include identifying training data and scoring data for the model based on the data (block 410). For example, the validation platform (e.g., using computing resource 224, processor 320, memory 330, and/or the like) may identify training data and scoring data for the model based on the data, as described above in connection with FIGS. 1A-2.

As further shown in FIG. 4, process 400 may include removing bias from the training data to generate unbiased training data (block 415). For example, the validation platform (e.g., using computing resource 224, processor 320, storage component 340, and/or the like) may remove bias from the training data to generate unbiased training data, as described above in connection with FIGS. 1A-2.

As further shown in FIG. 4, process 400 may include training the model with the unbiased training data to generate a plurality of trained models (block 420). For example, the validation platform (e.g., using computing resource 224, processor 320, memory 330, and/or the like) may train the model with the unbiased training data to generate a plurality of trained models, as described above in connection with FIGS. 1A-2.

As further shown in FIG. 4, process 400 may include processing the plurality of trained models, with the scoring data, to generate scores for the plurality of trained models (block 425). For example, the validation platform (e.g., using computing resource 224, processor 320, storage component 340, and/or the like) may process the plurality of trained models, with the scoring data, to generate scores for the plurality of trained models, as described above in connection with FIGS. 1A-2.

As further shown in FIG. 4, process 400 may include evaluating and selecting a trained model, from the plurality of trained models, based on model metrics and the scores (block 430). For example, the validation platform (e.g., using computing resource 224, processor 320, memory 330, and/or the like) may evaluate and select a trained model, from the plurality of trained models, based on model metrics and the scores, as described above in connection with FIGS. 1A-2.

As further shown in FIG. 4, process 400 may include creating a training sample for the trained model based on the unbiased training data and production data associated with a production environment in which the trained model is to be utilized (block 435). For example, the validation platform (e.g., using computing resource 224, processor 320, storage component 340, and/or the like) may create a training sample for the trained model based on the unbiased training data and production data associated with a production environment in which the trained model is to be utilized, as described above in connection with FIGS. 1A-2.

As further shown in FIG. 4, process 400 may include creating a production sample based on the production data and the training sample (block 440). For example, the validation platform (e.g., using computing resource 224, processor 320, memory 330, and/or the like) may create a production sample based on the production data and the training sample, as described above in connection with FIGS. 1A-2.

As further shown in FIG. 4, process 400 may include processing the training sample and the production sample, with the trained model, to generate first results associated with the training sample and second results associated with the production sample (block 445). For example, the validation platform (e.g., using computing resource 224, processor 320, storage component 340, and/or the like) may process the training sample and the production sample, with the trained model, to generate first results associated with the training sample and second results associated with the production sample, as described above in connection with FIGS. 1A-2.

As further shown in FIG. 4, process 400 may include validating the trained model for use in the production environment based on the first results and the second results (block 450). For example, the validation platform (e.g., using computing resource 224, processor 320, memory 330, and/or the like) may validate the trained model for use in the production environment based on the first results and the second results, as described above in connection with FIGS. 1A-2.

As further shown in FIG. 4, process 400 may include providing the trained model to be used in the production environment based on validating the trained model (block 455). For example, the validation platform (e.g., using computing resource 224, processor 320, memory 330, storage component 340, communication interface 370, and/or the like) may provide the trained model to be used in the production environment based on validating the trained model, as described above in connection with FIGS. 1A-2.

Process 400 may include additional implementations, such as any single implementation or any combination of implementations described below and/or described with regard to any other process described herein.

In some implementations, the validation platform may monitor a performance of the trained model in the production environment, and may update the trained model based on deviations between the performance of the trained model and the model metrics. In some implementations, when identifying the training data and the scoring data, the validation platform may identify temporal data, from the data, for inclusion in the training data or the scoring data, may identify data indicating boundary conditions, from the data, for inclusion in the training data or the scoring data, may identify data associated with entities, from the data, for inclusion in the training data or the scoring data, may identify data associated with positive and negative outcomes, from the data, for inclusion in the training data or the scoring data, may identify a first portion of the data for inclusion in the training data and a second portion of the data for inclusion in the scoring data, and/or the like.

In some implementations, when processing the plurality of trained models with the scoring data, the validation platform may perform a quantitative validation of the scores, and may perform a qualitative validation of the scores. In some implementations, when evaluating and selecting the trained model, the validation platform may compare a precision metric, associated with the plurality of trained models, and the scores, may compare a recall metric, associated with the plurality of trained models, and the scores, may compare a target leak metric, associated with the plurality of trained models, and the scores, and may select the trained model, from the plurality of trained models, based on comparing the precision metric, the recall metric, and the target leak metric and the scores.

In some implementations, when creating the training sample for the trained model based on the unbiased training data and the production data, the validation platform may identify a portion of the unbiased training data, may obtain specific production data, of the production data and associated with the portion of the unbiased training data, from the production environment, and may create the training sample based on the portion of the unbiased training data and the specific production data. In some implementations, when creating the production sample, the validation platform may identify specific production data, of the production data, with same inputs as the training sample, and may create the production sample based on the specific production data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for training, validating, and monitoring artificial intelligence and machine learning models. In some implementations, one or more process blocks of FIG. 5 may be performed by a validation platform (e.g., validation platform 220). In some implementations, one or more process blocks of FIG. 5 may be performed by another device or a group of devices separate from or including the validation platform, such as a client device (e.g., client device 210).

As shown in FIG. 5, process 500 may include identifying, from received data, training data and scoring data for a model (block 510). For example, the validation platform (e.g., using computing resource 224, processor 320, memory 330, communication interface 370, and/or the like) may identify, from received data, training data and scoring data for a model, as described above in connection with FIGS. 1A-2.

As further shown in FIG. 5, process 500 may include training the model with the training data to generate a plurality of trained models (block 520). For example, the validation platform (e.g., using computing resource 224, processor 320, memory 330, and/or the like) may train the model with the training data to generate a plurality of trained models, as described above in connection with FIGS. 1A-2.

As further shown in FIG. 5, process 500 may include processing the plurality of trained models, with the scoring data, to generate scores for the plurality of trained models (block 530). For example, the validation platform (e.g., using computing resource 224, processor 320, storage component 340, and/or the like) may process the plurality of trained models, with the scoring data, to generate scores for the plurality of trained models, as described above in connection with FIGS. 1A-2.

As further shown in FIG. 5, process 500 may include selecting a trained model, from the plurality of trained models, based on model metrics and the scores (block 540). For example, the validation platform (e.g., using computing resource 224, processor 320, memory 330, and/or the like) may select a trained model, from the plurality of trained models, based on model metrics and the scores, as described above in connection with FIGS. 1A-2.

As further shown in FIG. 5, process 500 may include processing a training sample, with the trained model, to generate first results, the training sample having been created based on the training data and production data associated with a production environment in which the trained model is to be utilized (block 550). For example, the validation platform (e.g., using computing resource 224, processor 320, storage component 340, and/or the like) may process a training sample, with the trained model, to generate first results, as described above in connection with FIGS. 1A-2. In some implementations, the training sample may have been created based on the training data and production data associated with a production environment in which the trained model is to be utilized.

As further shown in FIG. 5, process 500 may include processing a production sample, with the trained model, to generate second results, the production sample having been created based on the production data and the training sample (block 560). For example, the validation platform (e.g., using computing resource 224, processor 320, memory 330, and/or the like) may process a production sample, with the trained model, to generate second results, as described above in connection with FIGS. 1A-2. In some implementations, the production sample may have been created based on the production data and the training sample.

As further shown in FIG. 5, process 500 may include validating the trained model for use in the production environment based on the first results and the second results match (block 570). For example, the validation platform (e.g., using computing resource 224, processor 320, storage component 340, and/or the like) may validate the trained model for use in the production environment based on the first results and the second results match, as described above in connection with FIGS. 1A-2.

As further shown in FIG. 5, process 500 may include providing the trained model to be used in the production environment based on validating the trained model (block 580). For example, the validation platform (e.g., using computing resource 224, processor 320, memory 330, communication interface 370, and/or the like) may provide the trained model to be used in the production environment based on validating the trained model, as described above in connection with FIGS. 1A-2.

Process 500 may include additional implementations, such as any single implementation or any combination of implementations described below and/or described with regard to any other process described herein.

In some implementations, the validation platform may monitor a performance of the trained model in the production environment, may determine deviations between the performance of the trained model and the model metrics, and may update the trained model based on the deviations. In some implementations, when identifying the training data and the scoring data, the validation platform may include temporal data, from the received data, in the training data or the scoring data, may include data indicating boundary conditions, from the received data, in the training data or the scoring data, may include data associated with entities, from the received data, in the training data or the scoring data, may include data associated with positive and negative outcomes, from the received data, in the training data or the scoring data, may include a first portion of the received data in the training data and a second portion of the received data in the scoring data, and/or the like.

In some implementations, when processing the plurality of trained models with the scoring data, the validation platform may perform a quantitative validation of the scores based on a set of training observations, and may perform a qualitative validation of the scores based on histograms associated with the training data and the scoring data. In some implementations, when selecting the trained model, the validation platform may compare one or more of a precision metric, a recall metric, or a target leak metric, associated with the plurality of trained models, and the scores, and may select the trained model, from the plurality of trained models, based on comparing the one or more of the precision metric, the recall metric, or the target leak metric and the scores.

In some implementations, the validation platform may identify a portion of the training data, may capture specific production data, of the production data and associated with the portion of the training data, from the production environment, and may create the training sample based on the portion of the training data and the specific production data. In some implementations, the validation platform may identify specific production data, of the production data, with same inputs as the training sample, and may create the production sample based on the specific production data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for training, validating, and monitoring artificial intelligence and machine learning models. In some implementations, one or more process blocks of FIG. 6 may be performed by a validation platform (e.g., validation platform 220). In some implementations, one or more process blocks of FIG. 6 may be performed by another device or a group of devices separate from or including the validation platform, such as a client device (e.g., client device 210).

As shown in FIG. 6, process 600 may include identifying training data and scoring data for a model (block 610). For example, the validation platform (e.g., using computing resource 224, processor 320, memory 330, and/or the like) may identify training data and scoring data for a model, as described above in connection with FIGS. 1A-2.

As further shown in FIG. 6, process 600 may include removing bias from the training data to generate unbiased training data (block 620). For example, the validation platform (e.g., using computing resource 224, processor 320, storage component 340, and/or the like) may remove bias from the training data to generate unbiased training data, as described above in connection with FIGS. 1A-2.

As further shown in FIG. 6, process 600 may include training the model with the unbiased training data to generate a plurality of trained models (block 630). For example, the validation platform (e.g., using computing resource 224, processor 320, memory 330, and/or the like) may train the model with the unbiased training data to generate a plurality of trained models, as described above in connection with FIGS. 1A-2.

As further shown in FIG. 6, process 600 may include processing the plurality of trained models, with the scoring data, to generate scores for the plurality of trained models (block 640). For example, the validation platform (e.g., using computing resource 224, processor 320, storage component 340, and/or the like) may process the plurality of trained models, with the scoring data, to generate scores for the plurality of trained models, as described above in connection with FIGS. 1A-2.

As further shown in FIG. 6, process 600 may include selecting a trained model, from the plurality of trained models, based on model metrics and the scores (block 650). For example, the validation platform (e.g., using computing resource 224, processor 320, memory 330, and/or the like) may select a trained model, from the plurality of trained models, based on model metrics and the scores, as described above in connection with FIGS. 1A-2.

As further shown in FIG. 6, process 600 may include processing a training sample, with the trained model, to generate first results, the training sample having been created based on the unbiased training data and production data associated with a production environment in which the trained model is to be utilized (block 660). For example, the validation platform (e.g., using computing resource 224, processor 320, storage component 340, and/or the like) may process a training sample, with the trained model, to generate first results, the training sample having been created based on the unbiased training data and production data associated with a production environment in which the trained model is to be utilized, as described above in connection with FIGS. 1A-2.

As further shown in FIG. 6, process 600 may include processing a production sample, with the trained model, to generate second results, the production sample having been created based on the production data and the training sample (block 670). For example, the validation platform (e.g., using computing resource 224, processor 320, memory 330, and/or the like) may process a production sample, with the trained model, to generate second results, as described above in connection with FIGS. 1A-2. In some implementations, the production sample may have been created based on the production data and the training sample.

As further shown in FIG. 6, process 600 may include providing the trained model for use in the production environment based on the first results and the second results (block 680). For example, the validation platform (e.g., using computing resource 224, processor 320, memory 330, storage component 340, communication interface 370, and/or the like) may provide the trained model for use in the production environment based on the first results and the second results, as described above in connection with FIGS. 1A-2.

Process 600 may include additional implementations, such as any single implementation or any combination of implementations described below and/or described with regard to any other process described herein.

In some implementations, the validation platform may monitor a performance of the trained model in the production environment, may determine deviations between the performance of the trained model and the model metrics, and may update the trained model based on the deviations. In some implementations, when processing the plurality of trained models with the scoring data, the validation platform may perform a quantitative validation of the scores based on a set of training observations, and perform a qualitative validation of the scores based on histograms associated with the training data and the scoring data.

In some implementations, when selecting the trained model, the validation platform may compare a precision metric, a recall metric, and a target leak metric, associated with the plurality of trained models, and the scores, and may select the trained model, from the plurality of trained models, based on comparing the precision metric, the recall metric, and the target leak metric and the scores.

In some implementations, the validation platform may identify a portion of the training data, may capture specific production data, of the production data and associated with the portion of the training data, from the production environment, and may create the training sample based on the portion of the training data and the specific production data. In some implementations, the validation platform may identify specific production data, of the production data, with same inputs as the training sample, and may create the production sample based on the specific production data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a model and data for the model,
      the model including an artificial intelligence model or a machine learning model;
   identify training data and scoring data for the model based on the data;
   remove bias from the training data to generate unbiased training data;
   train the model with the unbiased training data to generate a plurality of trained models;
   process the plurality of trained models, with the scoring data, to generate scores for the plurality of trained models;
   evaluate and select a trained model, from the plurality of trained models, based on model metrics and the scores,
      wherein the one or more processors, when evaluating and selecting the trained model, are to:
      compare a precision metric, associated with the plurality of trained models, and the scores;
      compare a recall metric, associated with the plurality of trained models, and the scores;
      compare a target leak metric, associated with the plurality of trained models, and the scores; and
      select the trained model, from the plurality of trained models, based on comparing each of the precision metric, the recall metric, and the target leak metric and the scores;
create a training sample for the trained model based on the unbiased training data and production data associated with a production environment in which the trained model is to be utilized;
create a production sample based on the production data and the training sample;
process the training sample and the production sample, with the trained model, to generate first results associated with the training sample and second results associated with the production sample;
validate the trained model for use in the production environment based on the first results and the second results;
provide the trained model to be used in the production environment based on validating the trained model;
monitor a performance of the trained model in the production environment;
determine at least one deviation in the performance of the trained model as indicated by at least one of the precision metric, the recall metric, or the target leak metric; and
update the trained model based on the at least one deviation.

2. The device of claim 1, wherein the one or more processors, when identifying the training data and the scoring data, are to one or more of:
identify temporal data, from the data, for inclusion in the training data or the scoring data,
identify data indicating boundary conditions, from the data, for inclusion in the training data or the scoring data,
identify data associated with entities, from the data, for inclusion in the training data or the scoring data,
identify data associated with positive and negative outcomes, from the data, for inclusion in the training data or the scoring data, or
identify a first portion of the data for inclusion in the training data and a second portion of the data for inclusion in the scoring data.

3. The device of claim 1, wherein the one or more processors, when processing the plurality of trained models with the scoring data, are to:
perform a quantitative validation of the scores; and
perform a qualitative validation of the scores.

4. The device of claim 1, wherein the one or more processors, when creating the training sample for the trained model based on the unbiased training data and the production data, are to:
identify a portion of the unbiased training data;
obtain specific production data, of the production data and associated with the portion of the unbiased training data, from the production environment; and
create the training sample based on the portion of the unbiased training data and the specific production data.

5. The device of claim 1, wherein the one or more processors, when creating the production sample, are to:
identify specific production data, of the production data, with same inputs as the training sample; and
create the production sample based on the specific production data.

6. The device of claim 1, wherein:
the precision metric indicating a proportion of model output that was handled accurately,
the recall metric indicating a measure of breadth of the proportion of the model output that was handled correctly, and
the target leak metric indicating whether the scoring data was erroneously included in the model output.

7. The device of claim 1, wherein the one or more processors, when updating the trained model based on the at least one deviation, are to:
retrain the trained model.

8. A non-transitory computer-readable medium storing instructions, the instructions comprising:
one or more instructions that, when executed by one or more processors of a device, cause the one or more processors to:
identify, from received data, training data and scoring data for a model;
train the model with the training data to generate a plurality of trained models;
process the plurality of trained models, with the scoring data, to generate scores for the plurality of trained models;
compare each of a precision metric, a recall metric, and a target leak metric, associated with the plurality of trained models, and the scores;
select a trained model, from the plurality of trained models, based on comparing each of the precision metric, the recall metric, and the target leak metric, and the scores;
process a training sample, with the trained model, to generate first results,
the training sample having been created based on the training data and production data associated with a production environment in which the trained model is to be utilized;
process a production sample, with the trained model, to generate second results, the production sample having been created based on the production data and the training sample;
validate the trained model for use in the production environment based on the first results and the second results match;
provide the trained model to be used in the production environment based on validating the trained model;
monitor a performance of the trained model in the production environment;
determine at least one deviation in the performance of the trained model as indicated by at least one of the precision metric, the recall metric, or the target leak metric; and
update the trained model based on the at least one deviation.

9. The non-transitory computer-readable medium of claim 8, wherein the one or more instructions, that cause the one or more processors to identify the training data and the scoring data, cause the one or more processors to one or more of:
include temporal data, from the received data, in the training data or the scoring data,
include data indicating boundary conditions, from the received data, in the training data or the scoring data,
include data associated with entities, from the received data, in the training data or the scoring data,
include data associated with positive and negative outcomes, from the received data, in the training data or the scoring data, or include a first portion of the received data in the training data and a second portion of the received data in the scoring data.

10. The non-transitory computer-readable medium of claim 8, wherein the one or more instructions, that cause the one or more processors to process the plurality of trained models with the scoring data, cause the one or more processors to:
perform a quantitative validation of the scores based on a set of training observations; and
perform a qualitative validation of the scores based on histograms associated with the training data and the scoring data.

11. The non-transitory computer-readable medium of claim 8, wherein the instructions further comprise:
one or more instructions that, when executed by the one or more processors, cause the one or more processors to:
identify a portion of the training data;
capture specific production data, of the production data and associated with the portion of the training data, from the production environment; and
create the training sample based on the portion of the training data and the specific production data.

12. The non-transitory computer-readable medium of claim 8, wherein the instructions further comprise:
one or more instructions that, when executed by the one or more processors, cause the one or more processors to:
identify specific production data, of the production data, with same inputs as the training sample; and
create the production sample based on the specific production data.

13. The non-transitory computer-readable medium of claim 8, wherein:
the precision metric indicating a proportion of model output that was handled accurately,
the recall metric indicating a measure of breadth of the proportion of the model output that was handled correctly, and
the target leak metric indicating whether a portion of the scoring data was included in the model output.

14. The non-transitory computer-readable medium of claim 8, wherein the one or more instructions, that cause the one or more processors to monitor the performance of the trained model in the production environment, cause the one or more processors to:
monitor the precision metric, the recall metric, and the target leak metric of the trained model.

15. A method, comprising:
identifying, by a device, training data and scoring data for a model;
removing, by the device, bias from the training data to generate unbiased training data;
training, by the device, the model with the unbiased training data to generate a plurality of trained models;
processing, by the device, the plurality of trained models, with the scoring data, to generate scores for the plurality of trained models;
comparing, by the device, each of a precision metric, a recall metric, and a target leak metric, associated with the plurality of trained models, and the scores;
selecting, by the device, a trained model, from the plurality of trained models, based on comparing each of the precision metric, the recall metric, and the target leak metric, and the scores;
processing, by the device, a training sample, with the trained model, to generate first results,
the training sample having been created based on the unbiased training data and production data associated with a production environment in which the trained model is to be utilized;
processing, by the device, a production sample, with the trained model, to generate second results,
the production sample having been created based on the production data and the training sample;
providing, by the device, the trained model for use in the production environment based on the first results and the second results;
monitoring, by the device, a performance of the trained model in the production environment;
determining, by the device, at least one deviation the performance of the trained model as indicated by at least one of the precision metric, the recall metric, and the target leak metric; and
updating, by the device, the trained model based on the at least one deviation.

16. The method of claim 15, wherein processing the plurality of trained models with the scoring data includes:
performing a quantitative validation of the scores based on a set of training observations; and
performing a qualitative validation of the scores based on histograms associated with the training data and the scoring data.

17. The method of claim 15, further comprising:
identifying a portion of the training data;
capturing specific production data, of the production data and associated with the portion of the training data, from the production environment; and
creating the training sample based on the portion of the training data and the specific production data.

18. The method of claim 15, further comprising:
identifying specific production data, of the production data, with same inputs as the training sample; and
creating the production sample based on the specific production data.

19. The method of claim 15, wherein:
the precision metric indicating a proportion of model output that was handled accurately,
the recall metric indicating a measure of breadth of the proportion of the model output that was handled correctly, and
the target leak metric indicating whether the scoring data was erroneously included in the model output.

20. The method of claim 15, wherein removing the bias from the training data comprises:
providing a debiasing model with an extract of the training data as input,
the debiasing model detecting the bias in the training data based on word embeddings;
receiving, from the debiasing model, output identifying the bias; and
removing the bias from the training data.

* * * * *